(12) United States Patent
Athley et al.

(10) Patent No.: US 10,622,715 B2
(45) Date of Patent: Apr. 14, 2020

(54) BEAM FORMING USING AN ANTENNA ARRANGEMENT

(71) Applicant: Telefonaktiebolaget LM Ericsson (publ), Stockholm (SE)

(72) Inventors: Fredrik Athley, Kullavik (SE); Sven Petersson, Sävedalen (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 119 days.

(21) Appl. No.: 15/548,445

(22) PCT Filed: Mar. 6, 2015

(86) PCT No.: PCT/EP2015/054783
§ 371 (c)(1),
(2) Date: Aug. 3, 2017

(87) PCT Pub. No.: WO2016/141961
PCT Pub. Date: Sep. 15, 2016

(65) Prior Publication Data
US 2018/0026367 A1    Jan. 25, 2018

(51) Int. Cl.
*H01Q 3/40* (2006.01)
*H04B 7/06* (2006.01)
(Continued)

(52) U.S. Cl.
CPC ............... *H01Q 3/40* (2013.01); *H01Q 1/246* (2013.01); *H01Q 21/0025* (2013.01);
(Continued)

(58) Field of Classification Search
CPC ...... H01Q 3/40; H01Q 21/0025; H01Q 1/246; H04B 7/10; H04B 7/0691; H04B 7/0617
(Continued)

(56) References Cited

U.S. PATENT DOCUMENTS 6,218,987 B1    4/2001 Derneryd et al.
7,027,839 B2    4/2006 Umesh et al.
(Continued)

FOREIGN PATENT DOCUMENTS

CN    1261989 A    8/2000
CN    102404035 A    4/2012
(Continued)

OTHER PUBLICATIONS

Rappaport, T. et al., "State of the Art in 60-GHz Integrated Circuits and Systems for Wireless Communications", Proceedings of the IEEE, Aug. 2011, pp. 1390-1436, vol. 99, No. 8.
(Continued)

*Primary Examiner* — Bo Fan
(74) *Attorney, Agent, or Firm* — Coats + Bennett, PLLC (57) ABSTRACT

There is provided mechanisms for beam forming using an antenna array comprising dual polarized elements. A method comprises generating one or two beam ports, wherein the one or two beam ports are defined by combining at least two non-overlapping subarrays. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe. The method comprises transmitting signals using said one or two beam ports.

14 Claims, 8 Drawing Sheets (51) Int. Cl.
  *H04B 7/10* (2017.01)
  *H01Q 1/24* (2006.01)
  *H01Q 21/00* (2006.01)

(52) U.S. Cl.
  CPC ......... *H04B 7/0617* (2013.01); *H04B 7/0691* (2013.01); *H04B 7/10* (2013.01)

(58) Field of Classification Search
  USPC ........................................................ 342/373
  See application file for complete search history.

(56) References Cited

U.S. PATENT DOCUMENTS

| | | | |
|---|---|---|---|
| 7,062,002 | B1 | 6/2006 | Michel et al. |
| 8,774,079 | B2 * | 7/2014 | Proctor, Jr. .............. H04B 7/04 370/315 |
| 8,994,588 | B2 | 3/2015 | Petersson et al. |
| 9,059,760 | B2 | 6/2015 | Jiang |
| 9,509,387 | B2 | 11/2016 | Athley et al. |
| 9,960,828 | B2 | 5/2018 | Petersson et al. |
| 10,014,923 | B2 | 7/2018 | Molnar et al. |
| 2005/0157805 | A1 | 7/2005 | Walton et al. |
| 2006/0008021 | A1 | 1/2006 | Bonnet |
| 2007/0135161 | A1 | 6/2007 | Molnar et al. |
| 2008/0187066 | A1 | 8/2008 | Wang et al. |
| 2009/0033556 | A1 | 2/2009 | Stickley et al. |
| 2009/0066595 | A1 | 3/2009 | Barker |
| 2009/0080560 | A1 | 3/2009 | Na et al. |
| 2009/0190681 | A1 | 7/2009 | Moulsley et al. |
| 2010/0104036 | A1 | 4/2010 | Liao et al. |
| 2010/0158331 | A1 | 6/2010 | Jacobs et al. |
| 2010/0189047 | A1 | 7/2010 | Baum et al. |
| 2010/0310009 | A1 | 12/2010 | Lakkis |
| 2010/0316154 | A1 | 12/2010 | Park et al. |
| 2011/0019759 | A1 | 1/2011 | Stager et al. |
| 2011/0199992 | A1 | 8/2011 | Barker et al. |
| 2011/0212730 | A1 | 9/2011 | Wennstrom et al. |
| 2011/0216845 | A1 | 9/2011 | Nakao et al. |
| 2012/0027111 | A1 | 2/2012 | Vook et al. |
| 2012/0212372 | A1 | 8/2012 | Petersson et al. |
| 2012/0274514 | A1 | 11/2012 | Petersson |
| 2012/0287981 | A1 | 11/2012 | Xiao et al. |
| 2012/0319920 | A1 | 12/2012 | Athley et al. |
| 2013/0120191 | A1 | 5/2013 | Zhang et al. |
| 2013/0121276 | A1 | 5/2013 | Kim et al. |
| 2014/0071792 | A1 | 3/2014 | Yoo et al. |
| 2014/0285373 | A1 | 9/2014 | Kuwahara et al. |
| 2014/0362946 | A1 | 12/2014 | Kakishima et al. |
| 2015/0010106 | A1 | 1/2015 | Skov et al. |
| 2015/0326289 | A1 | 11/2015 | Kim et al. |
| 2015/0333884 | A1 * | 11/2015 | Athley ................... H04L 5/0048 375/295 |
| 2016/0021551 | A1 | 1/2016 | Park et al. |
| 2016/0065290 | A1 | 3/2016 | Zhu et al. |
| 2016/0149680 | A1 | 5/2016 | Kang et al. |
| 2016/0377713 | A1 | 12/2016 | Kamo et al. |
| 2017/0041113 | A1 * | 2/2017 | Park ........................ H04B 7/04 |
| 2017/0310376 | A1 | 10/2017 | Jarmyr |

FOREIGN PATENT DOCUMENTS

| | | | |
|---|---|---|---|
| CN | 102640352 A | 8/2012 | |
| EP | 1764867 B1 | 7/2008 | |
| EP | 2680471 A1 | 1/2014 | |
| RU | 2374724 C1 | 11/2009 | |
| RU | 2009119753 A | 12/2010 | |
| WO | 9933212 A1 | 7/1999 | |
| WO | 0054424 A2 | 9/2000 | |
| WO | 0062436 A1 | 10/2000 | |
| WO | 2007082408 A1 | 7/2007 | |
| WO | 2011050866 A1 | 5/2011 | |
| WO | WO-2011050866 A1 * | 5/2011 | ............... H01Q 3/26 |
| WO | 2014206443 A1 | 12/2014 | |
| WO | WO-2014206443 A1 * | 12/2014 | |
| WO | 2015081999 A1 | 6/2015 | |
| WO | 2016102010 A1 | 6/2016 | |
| WO | 2017190777 A1 | 11/2017 | |
| WO | 2017190811 A1 | 11/2017 | |

OTHER PUBLICATIONS

Dueck, G., "New Optimization Heuristics. The Great Deluge Algorithm and the Record-t0-Record Travel", Journal of Computational Physics, vol. 104, Issue 1, Jan. 1, 1993, pp. 86-92.

Ericsson, "Precoding Codebook Design for Four branch MIMO System", 3GPP TSG-RAN WG1 #68bis, Jeju, South Korea, Mar. 26, 2012, pp. 1-14, R1-121761, 3GPP.

Kokshoorn, M. et al., "Fast Channel Estimation for Millimetre Wave Wireless Systems Using Overlapped Beam Patterns", 2015 IEEE International Conference on Communications (ICC)—Millimeter-Wave Communications, Jun. 8, 2015, pp. 1304-1309, IEEE.

* cited by examiner

BEAM FORMING USING AN ANTENNA ARRANGEMENT

TECHNICAL FIELD

Embodiments presented herein relate to beam forming, and particularly a method, an antenna array, and a computer program for beam forming using an antenna array comprising dual polarized elements.

BACKGROUND

In communications networks, there may be a challenge to obtain good performance and capacity for a given communications protocol, its parameters and the physical environment in which the communications network is deployed.

One component of wireless communications networks where it may be challenging to obtain good performance and capacity is the antennas of network nodes configured for wireless communications; either to/from another network node, and/or to/from a wireless user terminal.

For example, massive beam forming, i.e., beam forming using active antenna arrays with orders of magnitudes more antenna elements than used in current communications networks, is expected to become a technical component in the radio access part of future fifth generation (5G) communications networks. By using large antenna arrays at the radio base stations, user data can be transmitted focused in space so that energy is received mainly by the wireless device dedicated by the user data, thus resulting in little interference being perceived by other wireless devices or other types of nodes. Massive beam forming has therefore the potential to increase system capacity and energy efficiency by orders of magnitudes.

One potential issue with massive beam forming may be related to the fact that the beams may be so narrow that data may only be received by the dedicated wireless device. For user data this is desired, but some data, e.g., system information, preferably needs to be transmitted to all, or at least most of, wireless devices (i.e., broadcasted) in the communications network.

Therefore such data should be transmitted with wide coverage in order to reach all wireless devices. Some ways to address this issue will be summarized next. However, as also noted, each of these ways have their drawbacks.

According to a first approach, a separate wide-beam antenna may be used for transmission of broadcast data. A drawback with this approach is that it requires additional hardware.

According to a second approach, broadcast data is transmitted using a single antenna array element, or sub-array, of the antenna. This array element or sub-array will have a wider beam than the full array of the antenna. A drawback of this approach is that only one, or a few, power amplifiers (PAs) in the antenna array is/are utilized, which thus wastes power resources.

According to a third approach, amplitude and/or phase tapering is used over the full array of the antenna to widen the beam. Drawbacks with such tapering are that amplitude tapering gives poor utilization of the PA resource and that it is in many cases not possible to synthesize the desired beam shape using phase-only tapering.

According to a fourth approach, broadcast data is transmitted sequentially in different directions using narrow beams. A potential drawback with this approach is that this takes longer time and consumes more resource elements than transmitting broadcast data simultaneously in all directions with a wide beam.

Other scenarios where it may be desired to use wide beams with an antenna array with many elements is in millimeter-wave (mmW) communications, which is an access technology foreseen to be a part of 5G radio access. Due to the increased propagation loss at such high frequencies, high gain beam forming may be needed to retain the link budget, possibly both at the receiver and transmitter. Beam forming may be needed since the dominant propagation paths between a transmitter and a receiver are typically not known a priori. Testing all combinations of a large number of narrow transmit and receive beams in order to find the best beam pair may consume a prohibitive amount of time/frequency resources. A way to resolve this issue may be for the radio base station to start the search procedure with wide beams and then make the beams narrower and narrower until the best pair of narrow beams has been found. Such a beam finding procedure generally requires means for generating beams with different beam widths in a flexible manner. In order to fully utilize the antenna array and the available PA resource it may be desired to use all antenna elements and all PAs at full power when transmitting beams with different beam widths.

Hence, there is a need for improved beam forming.

SUMMARY

An object of embodiments herein is to provide efficient beam forming.

According to a first aspect there is presented a method for beam forming using an antenna array comprising dual polarized elements. The method comprises generating one or two beam ports, wherein the one or two beam ports are defined by combining at least two non-overlapping subarrays. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe. The method comprises transmitting signals using said one or two beam ports.

Advantageously this provides efficient beam forming.

Advantageously this provides an antenna architecture and method for creating one or two beam ports with an adjustable beam width.

The one or two beam ports have identical power radiation patterns and orthogonal polarizations in any direction.

The beam width for the one or two beam ports can be very wide compared to the array size, even as wide as for a single element.

All power amplifiers of the antenna array can be fully utilized, i.e. with only phase taper applied, either by each beam port or by two beam ports together.

The antenna architecture may be based on either linear (1-D) or planar (2-D) antenna arrays.

According to a second aspect there is presented an antenna arrangement comprising an antenna array. The antenna array comprises dual polarized elements for beam forming. The antenna array further comprises a processing unit. The processing unit is configured to cause the antenna array to generate one or two beam ports, wherein the beam ports are defined by combining at least two non-overlapping subarrays. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe. The processing unit is configured to cause the antenna array to transmit signals using the one or two beam ports.

There is also presented a network node comprising an antenna arrangement according to the second aspect.

There is also presented a wireless device comprising an antenna arrangement according to the second aspect.

According to a third aspect there is presented a computer program for beam forming using an antenna array comprising dual polarized elements, the computer program comprising computer program code which, when run on a processing unit of a, causes the antenna array to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 17:
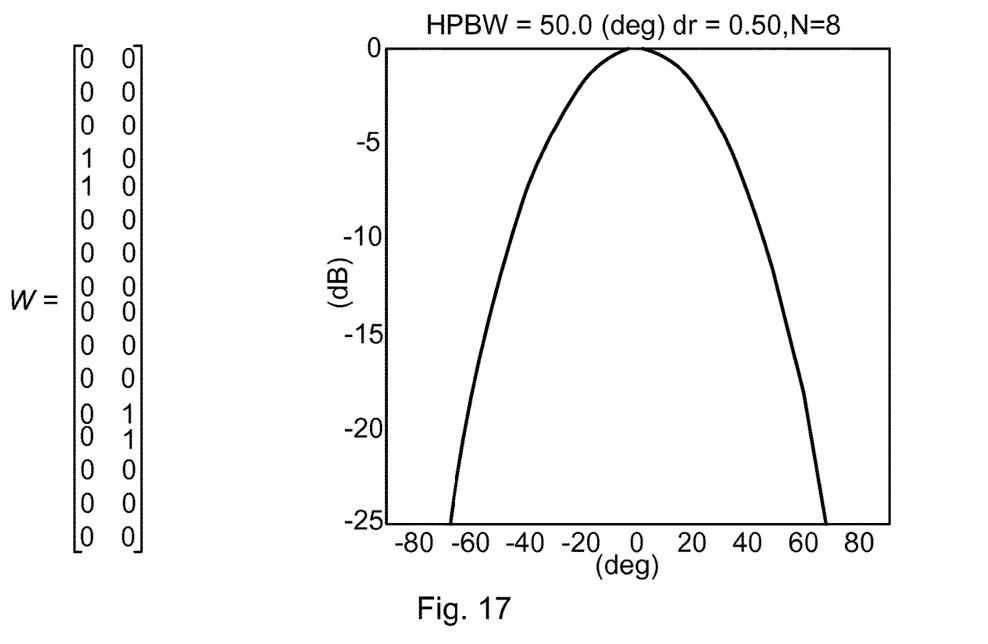
FIG. 17 shows simulation results for beamforming according to state of the art using pure amplitude taper per polarization.
Figure 18:
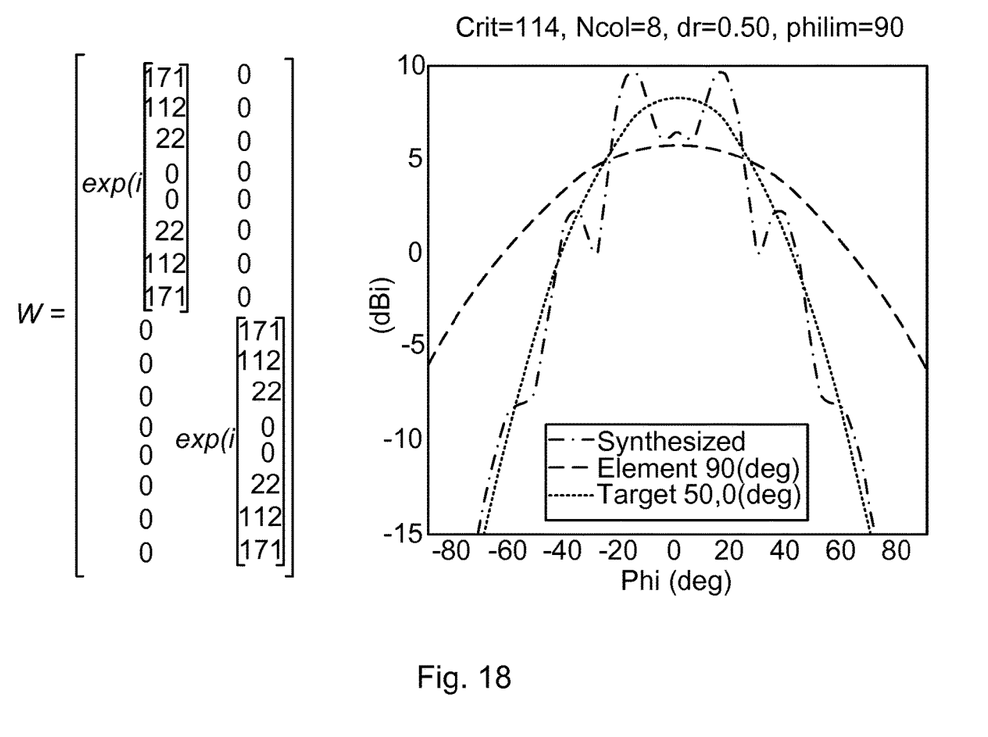
FIG. 18 shows simulation results for beamforming according to state of the art using pure phase taper per polarization.

Different ways to generate wide beams from a large dual polarized array have been proposed. One example is to apply a beam forming network, for example a Butler matrix, to each polarization direction of the antenna array and then transmit a signal via beams with alternating polarization to avoid undesired coherent addition of signals transmitted via adjacent beams with the same polarization. The resulting beam pattern typically ripples significantly, say, a couple of dB. FIG. 17 shows an example of wide beam pattern formed by means of conventional Single Polarized Beam Forming (SPBF), where a weight is applied per polarization in order to shape the desired beam pattern, again per polarization, and with many weight elements having an amplitude set to zero, thus resulting in poor power resource utilization. This may be regarded as an extreme case of amplitude taper. Another example involves applying amplitude tapering, which also may be regarded as providing satisfactory results in terms of generating a desired beam shape, but not in terms of utilization of power resource for transmission. Using only phase tapering in many cases results in a pattern that does not meet the desired properties but with satisfactory utilization of the power resource. The range of obtainable beam widths is also often limited. FIG. 18 shows an example of wide beam pattern formed by means of conventional (SPBF) beam forming but restricted to phase taper only for good poor power resource utilization. The result is a beam pattern showing undesired ripple.

The herein proposed antenna array and method offers both beam patterns with desired beamshapes, as well as excellent power utilization. The embodiments disclosed herein particularly relate to efficient beam forming. In order to obtain efficient beam forming here is provided an antenna array, a method performed by the antenna array, a computer program comprising code, for example in the form of a computer program product, that when run on a processing unit, causes the antenna array to perform the method.

Figure 1:
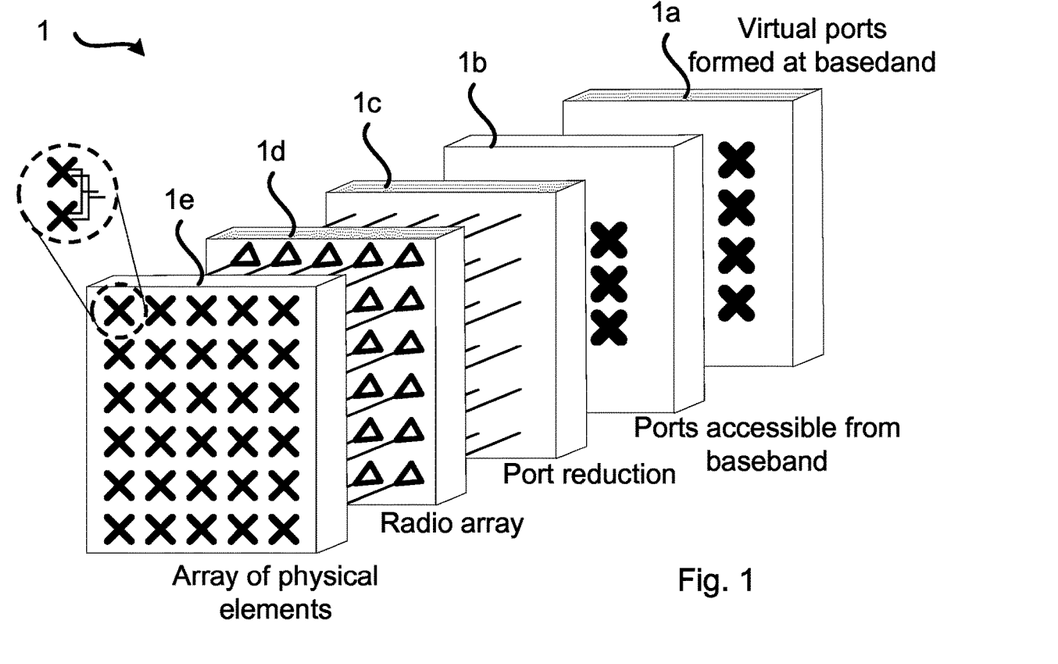
FIGS. 1, 2, 3, and 5 are schematic diagrams illustrating different aspects of antenna arrays according to embodiments.

FIG. 1 is a schematic block diagram illustrating an example architecture of a two dimensional antenna array 1 for which embodiments presented herein can be applied. However, the embodiments presented herein are equally applicable to one-dimensional antenna arrays. The antenna array 1 can thus either be a linear array (1-D), a uniform linear array (ULA), or planar array (2-D), uniform rectangular array (URA).

The antenna front end comprises an array 1e of antenna elements where each antenna element may be a sub-array of several radiating antenna elements connected via feed networks to two subarray ports having orthogonal polarization. Each subarray port is connected to a radio chain as comprised in a radio array 1d. The number of subarray ports in block 1b accessible to baseband signal processing may be reduced via a port reduction block 1c that creates new antenna ports that are (linear) combinations of the input antenna ports. Access is made to the subarray ports at baseband if both dedicated and broadcasted data is to be transmitted at the same time. Further, in general terms, access to all subarray ports may be needed for shaping wide beams according to the herein disclosed mechanisms for beam forming. In the baseband signal processing block 1a virtual antenna ports may be created by matrix multiplications. These virtual antenna ports may be of different type. For example, in LTE they may for a radio base station carry common reference signals (CRS) at ports 0-3, channel state information reference signals (CSI-RS) at port 15-22, and UE-specific reference signals and data at ports 7-14. In some implementations one or several blocks of the in the two dimensional antenna array 1 in FIG. 1 may be removed.

Figure 2:
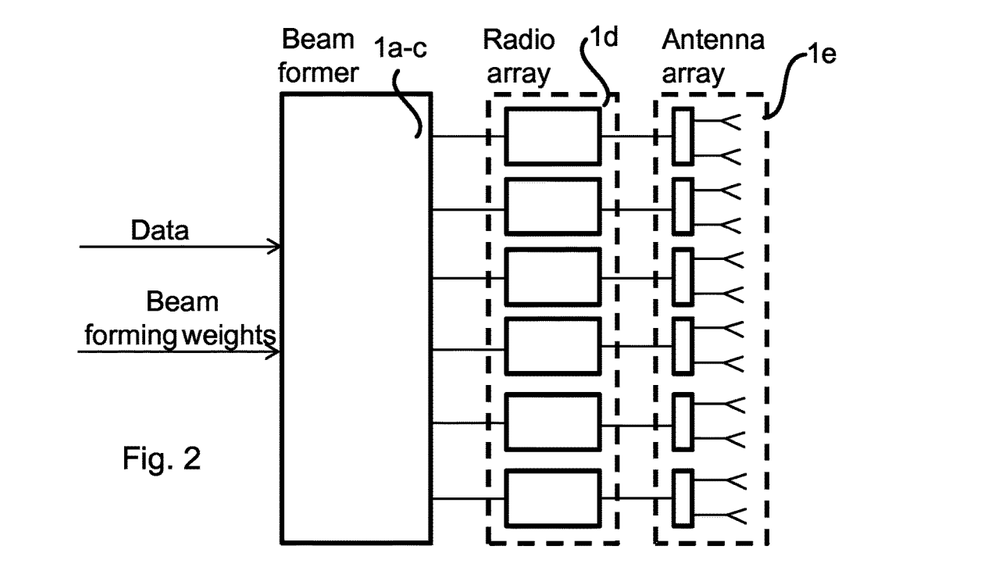
Figure 3:
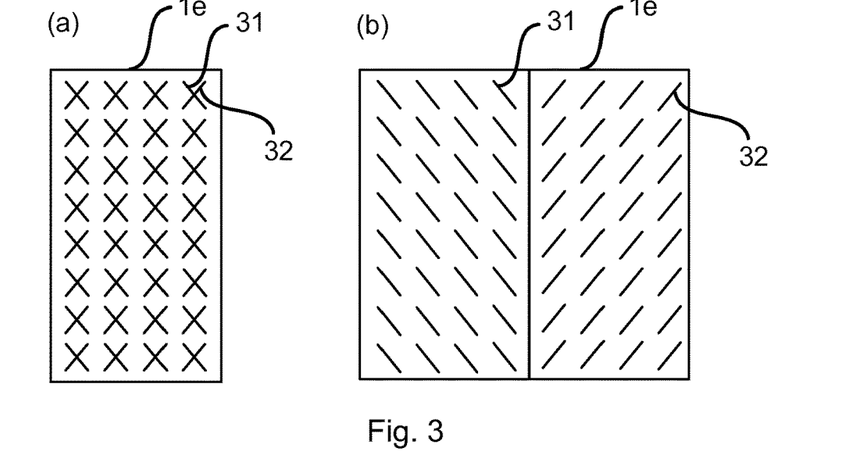

FIG. 2 is a schematic block diagram illustrating a possible implementation of the two dimensional antenna array 1 of FIG. 1. It comprises a beam former comprising blocks 1a, 1b, 1c of FIG. 1, a radio array id and a physical antenna array 1e. In the example of FIG. 2 there are two antenna ports per subarray. The beam former 1a-c is configured to receive user data and control data, beam forming weights for the user data, beam forming weights for reference signals, such as CSI-RS and beam forming weights for wide beam transmission. Each antenna element comprises two sub-elements 31, 32 having orthogonal polarizations in all directions (of interest). Typically these two sub-elements 31, 32 are located at the same position, as in FIG. 3(a), but they may as well be displaced in relation to each other, as in FIG. 3(b).

The antenna array 1 is configured to generate one or two beam ports, wherein the beam ports are defined by combining at least two non-overlapping subarrays. As the skilled person understands, the antenna array 1 may be configured to generate further ports defined for various transmissions. Each subarray has two subarray ports, the two subarray ports having identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe. The antenna array 1 is configured to transmit signals using the one or two beam ports. As the skilled person understands, the antenna array 1 may be configured to transmit further signals using the same, or further, beam ports.

Embodiments relating to further details of beam forming using an antenna array 1 will now be disclosed.

In general terms, the expansion weights describe how one or two beam ports, formed via a single set of subarrays, can be mapped onto multiple sets of subarrays. Hence, according to one embodiment the expansion weights map the one or two beam ports to subarray ports such that the one or two beam ports have the same power pattern as the subarrays, and in the case there are two beam ports, the two beam ports have mutually orthogonal polarizations in any direction.

There may be different ways to determine the at least two non-overlapping subarrays and to combine the at least two non-overlapping subarrays via the expansion weights. Different embodiments relating thereto will now be described in turn.

In general terms, generating the one or two beam ports yielding both the desired beamwidth and using the entire antenna array for good utilization of power resources may involve determining subarray port mappings for the one or two beam ports, and expanding subarray mappings to the entire antenna array.

Figure 4:
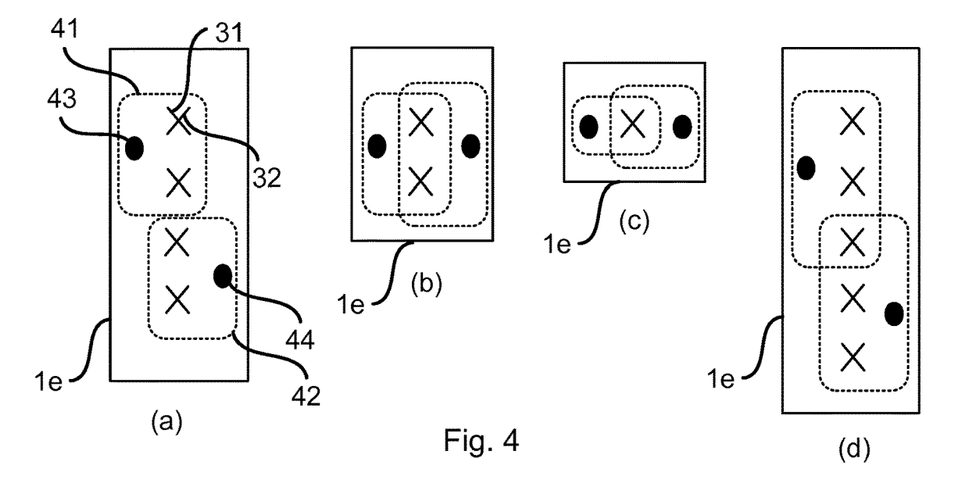
FIG. 4 schematically illustrates examples of subarrays.

For the subarray port mapping, a subarray is determined such that the desired beamwidth, or possibly beamshape, is achieved with as good power utilization as possible. The power utilization after expansion of the subarrays will be the same as for the subarray. FIG. 4 at (a), (b), (c), and (d) schematically illustrates four examples of antenna arrays 1e, each comprising two subarrays 41, 42, and each antenna arrays 1e comprising two beam ports 43, 44, respectively.

For expanding subarray mappings to the entire antenna array expansion weights based on powers of 2, 6 and 10 are used such that the total number of antenna elements used by a beam port, per dimension of the antenna array, will be $$D_{port}=D_{subarray}2^k 6^m 10^n, k=0,1,2 \ldots m=0,1,2, \ldots n=0,1,2,\ldots,$$

where $D_{subarray}$ is the number of elements used in the subarray for the antenna array dimension of interest. If only a single beam port is desired, factors of 3 or 5 are also possible. Hence, according to an embodiment, in the case there are two beam ports, and wherein the expansion weights map the two beam ports to products of powers of 2, 6, or 10 subarrays per dimension. The expression per dimension may, for example, be orthogonal spatial dimensions in a plane. And, according to an embodiment, in the case there is one beam port, and wherein the expansion weights map the two beam ports to powers of 2, 6, or 10 times 1, 3, or 5 subarrays. That is, for a single beam port mappings can be according to powers of 2, 6 and 10 times either 3 or 5. For a two dimensional array the mapping including expansion factors 3 or 5 can be done in one dimension only.

For maximal use of the antenna array the subarray size may be determined such that the subarray size, including the possible expansions, covers the entire array. Hence, according to an embodiment the at least two non-overlapping subarrays together cover all elements of the antenna array.

Figure 5:
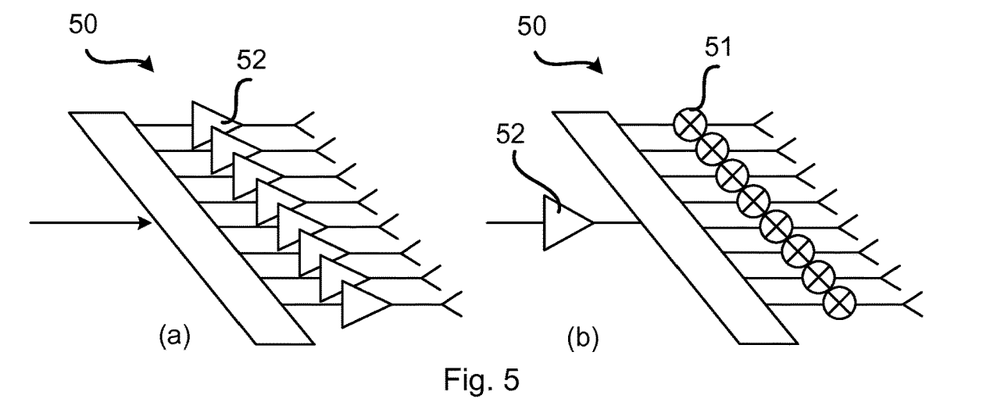

All antenna elements in the port mapping may have the same amplitude; the expansion itself gives full power utilization but the subarray may not reach that. One reason for using all antenna elements in the antenna array, as well as for the subarray port mapping, and thus beam port mapping, to have uniform amplitude, is to efficiently use the available power resource. This applies specifically for an active antenna array with distributed power amplifiers but it also applies for an antenna array with a power distribution network 50 comprising phase shifters 51, possibly also attenuators 52 as in FIGS. 5(a) and 5(b). This is especially suitable for beamforming performed via phase shifters only. The number of subarrays to use is given by combining powers of 2, 6 and 10, potentially multiplied by 3 or 5 in case of single beam port.

Figure 6:
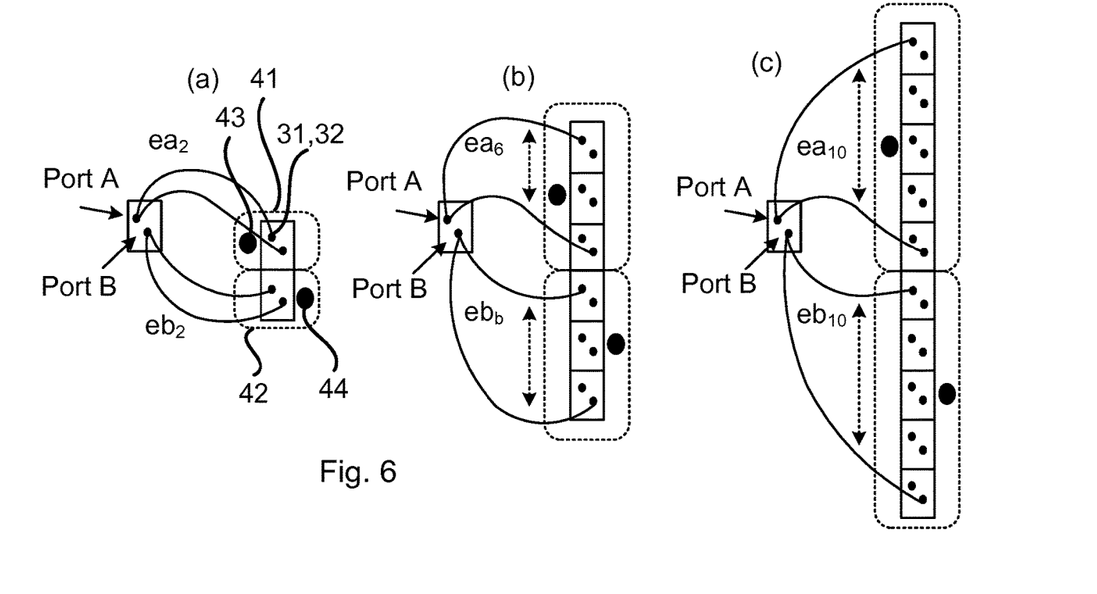
FIG. 6 schematically illustrates examples of port expansion.

The expansion weights thus describe how one or two beam ports, with beam shape as given by a single subarray, can be mapped onto multiple subarrays. FIG. 6 at (a), (b), and (c) schematically illustrates three examples of different pairs of expansion weights expanding the size of the antenna array by a factor of 2, 6 or 10, respectively.

Further embodiments relating to how the expansion weights may be determined will now be disclosed.

The expansion weights within a pair may be related such that the two beam ports have orthogonal polarization. Hence, according to an embodiment, in the case there are two beam ports, and wherein the expansion weights are defined to keep the polarization of the two beam ports mutually orthogonal.

According to an embodiment the expansion weights for a port a with a first polarization are determined as:

$$ea_2 = \begin{bmatrix} e^{i\frac{\pi}{4}[1 \;\; -1]} \\ Z_{12} \end{bmatrix},$$

$$ea_6 = \begin{bmatrix} e^{i\frac{\pi}{4}} \begin{bmatrix} 3 & 1 \\ 0 & 0 \\ 1 & 3 \end{bmatrix} \\ Z_{32} \end{bmatrix},$$

$$ea_{10} = \begin{bmatrix} e^{i\frac{\pi}{4}} \begin{bmatrix} -2 & 0 \\ -1 & 3 \\ 0 & 0 \\ 3 & -1 \\ 0 & -2 \end{bmatrix} \\ Z_{52} \end{bmatrix},$$

where $ea_m$ denotes the expansion weights for mapping the one port to multiples of m subarrays (or combinations of subarrays via expansions as herein disclosed), and where $Z_{rc}$ is an all-zero matrix having r rows and c columns.

The expansion weights for a port b with a second polarization, orthogonal to the first polarization, may then be determined as:

$$eb_m = \text{flipud}([ea_m(:,2) - ea_m(:,1)]^*),$$

where $ea_m(:,c)$ denotes column c of $ea_m$, where * denotes complex conjugate, and where flipud(x) reverses the row order of x. That is, the notations a and b denotes two orthogonal polarizations for a subarray port, combination of subarray ports or a beam port. It does not refer to the specific polarization for the different ports.

As the skilled person understands, these expansion matrixes are just examples. Other valid examples of expansion matrixes are, for example, obtainable by applying a phase shift to the shown matrixes.

Figure 7:
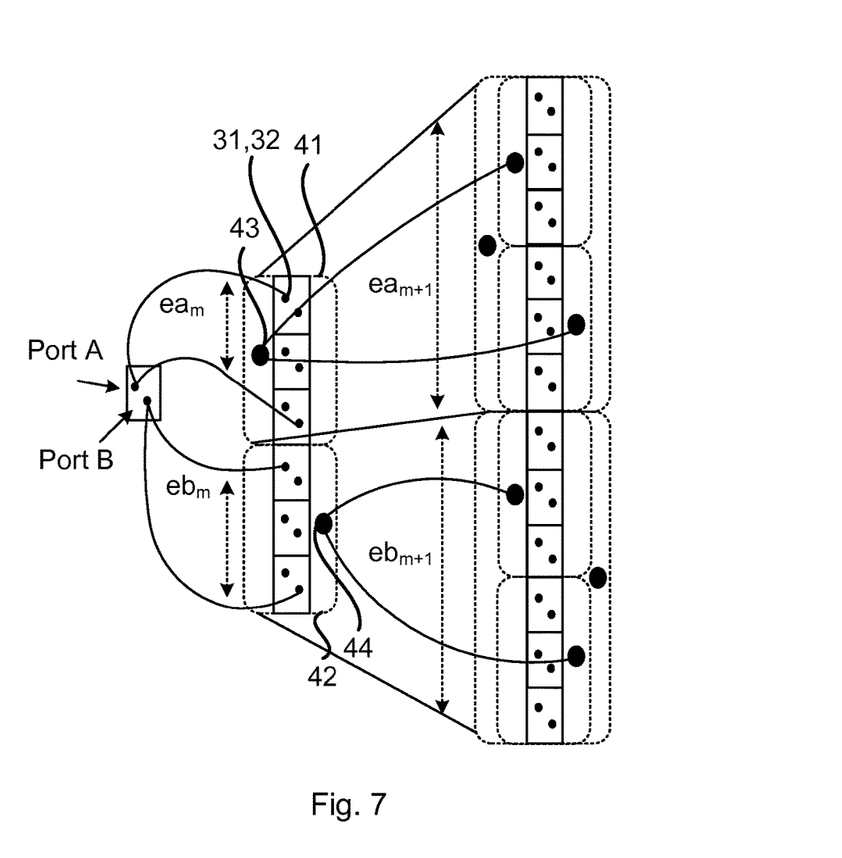
FIG. 7 schematically illustrates recursive port expansion.

Expansion factors may be concatenated to perform expansion in more than one step. Hence, according to an embodiment the subarrays are further expanded by further expansion weights before defining the one or two beam ports. The order in which expansions based on 2, 6 and 10 are applied is arbitrary whereas expansion with 3 or 5 must be the last one applied since that results in a single beam port only. These may be found from $ea_6$ and $ea_{10}$ as defined above by removing the lower, zero, part (i.e., $Z_{32}$ and $Z_{52}$, respectively) and not defining any eb mapping. FIG. 7 illustrates one illustrative example of how expansions can be recursively used in order to reach the desired size of the final weight vector. As is shown in FIG. 7, expansion factors may be concatenated with different expansion factors; a first expansion factor 6 (expansion ×6) is followed by a second expansion factor 2 (expansion ×2).

Figure 8:
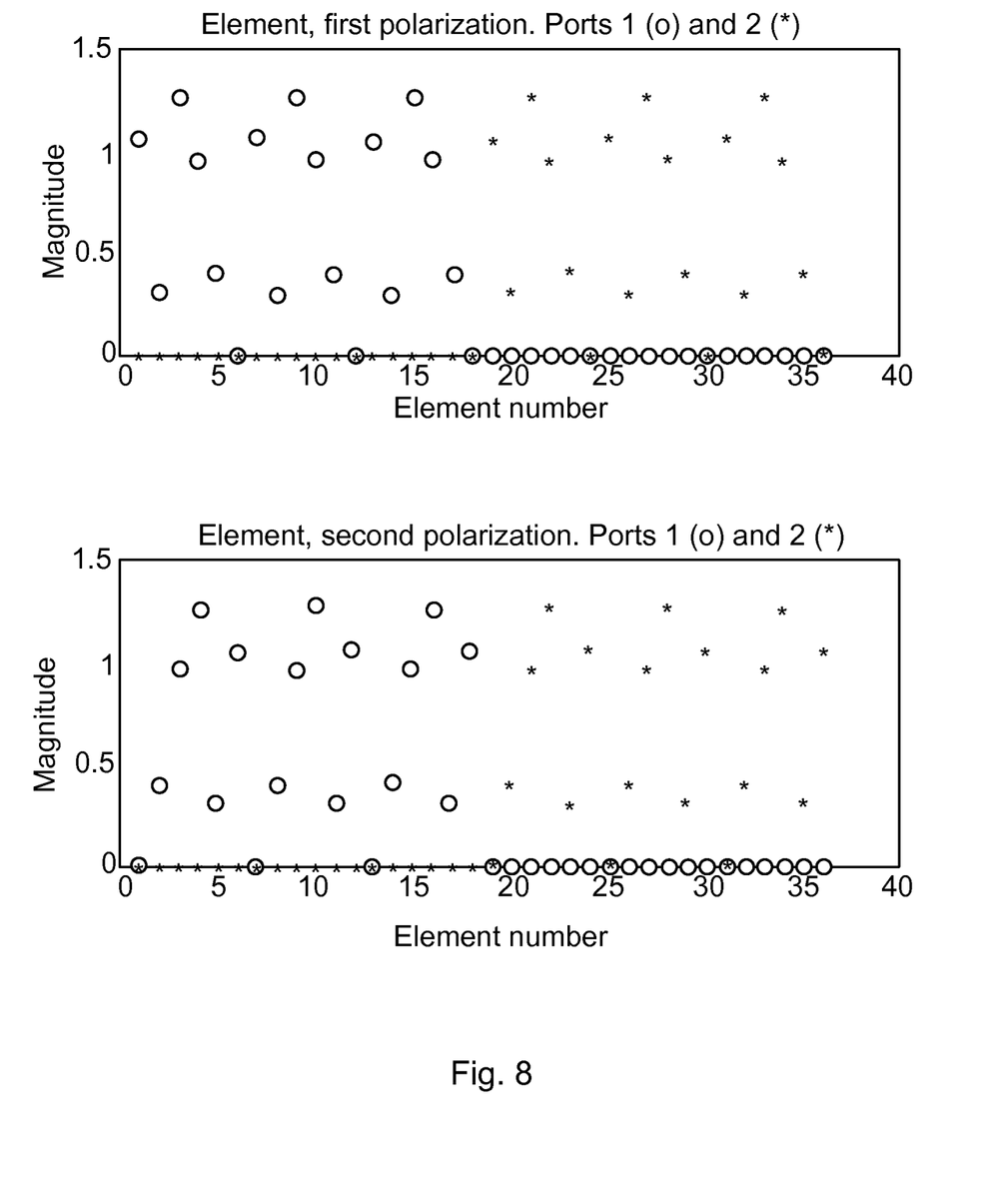
FIG. 8 schematically illustrates port mappings.

One example of power utilization after expansion is shown in FIG. 8 for two antenna ports. As can be seen in the upper part of FIG. 8 half of the antenna elements of a first polarization are connected to port 1 (0) and the other half to port 2 (*). The similar behavior applies, as shown in the lower part of FIG. 8, also for the second polarization. This means that the two antenna ports, in case of an active antenna with distributed power amplifiers, may not share the same power amplifiers. The varying magnitude in FIG. 8 comes from the subarray definition used in this case where non-equal amplitudes, for illustrative purposes, were selected for the sake of showing how the subarray amplitude variations are repeated over the array.

In some case it can be beneficial if both beam ports share the same power amplifiers whereas in other cases, for example if correlated signals are to be applied to the two antenna ports, this is may not be desired. One reason is that correlated signals in combination with shared power amplifiers may lead to non-uniform loading of the power amplifiers.

In case the antenna ports are to share power amplifiers, or in case only a single antenna port is to be used, this is achievable, for example, by adding the two expansion weights, each one defining a beam port, to each other, element by element. Hence, according to an embodiment the expansion weights of the at least two sub-arrays are added to generate one of the one or two beam ports. In case expansion by 3 or 5 is used the result is a single beam port mapped to all subarray ports, i.e., making use of all power resources. As the expansion of a subarray does not change the power pattern it follows that the array factor (which is given by the total expansion vector/matrix) may be spatially white to enable the two beam ports to, have power patterns identical to the subarray ports. According to an embodiment the expansion weights are determined such that all elements in a matrix defined by the sum of the magnitude squared of the two-dimensional discrete Fourier transform of a first expansion weight matrix applied to a first of the subarray ports and the magnitude squared of the two-dimensional discrete Fourier transform of a second expansion weight matrix applied to a second of the subarray ports have the same value. That is, the expansion weights may be determined such that:

$$|\text{DFT}(ea)|^2 + |\text{DFT}(eb)|^2 = k \cdot J_{rc},$$

where DFT(ea) and DFT(eb) denote the discrete Fourier transforms of ea and eb, respectively, where ea and eb are the total expansion matrices applied to the subarray ports a and b, respectively, where a is first of the subarray ports, where b is a second of the subarray ports, where k is a constant, and where $J_{rc}$ is an all-one matrix having r rows and c columns. In the case of a two-dimensional antenna array, the expansion weights are collected in a matrix. For a one-dimensional antenna array this matrix collapses into a vector (which could be seen as a special case of a matrix that has only one row or one column).

Even further details of how to generate expansion weights for a uniform rectangular array will be provided next. The starting point is expansion weight vectors per dimension as generated above. These expansion weight vectors are combined into two matrices, one per beam port.

First the expansion weight vectors for one beam port along a first dimension (here dimension y) with non-shared resources are determined. In case expansion with factors 3 or 5 is used for one of the dimensions (resulting in a single beam port using all resources) this dimension is selected as the y-dimension here. The full vector for a first beam port (i.e., beam port 1), comprising all elements (i.e., both polarization a and b) can be described as $$w_{1y} = \begin{bmatrix} w_{1ya} \\ w_{1yb} \end{bmatrix}$$

where $w_{1ya}$ and $w_{1yb}$ denote column vectors containing the expansion weights for beam port 1 applied to elements with polarization a and b respectively along the y dimension, and so on. Secondly, the expansion weight vectors for two beam ports along a second dimension (here dimension z) with non-shared resources are determined for a first port via consecutive expansions as follows $$w_{1z} = \begin{bmatrix} w_{1za} \\ w_{1zb} \end{bmatrix} \text{ and } w_{2z} = \begin{bmatrix} w_{2za} \\ w_{2zb} \end{bmatrix}$$

where $w_{2za}$ and $w_{2zb}$ denote column vectors containing the expansion weights for the second beam port (i.e., beam port 2) applied to elements with polarization and b respectively along the z dimension.

The two vectors $w_{1z}$ and $w_{2z}$ are related to yield orthogonal polarizations and the same power patterns. The relation is given according to $$w_{2z} = \begin{bmatrix} Fw_{1zb}^* \\ -Fw_{1za}^* \end{bmatrix}.$$

The notation "*" here denotes complex conjugate (and not Hermitian conjugate-transpose).

Here, F is a matrix that reverses the element (row) order in the vector; that is a matrix with ones on the anti-diagonal and zeros elsewhere.

$$F = \begin{bmatrix} 0 & \cdots & 1 \\ \vdots & \ddots & \vdots \\ 1 & \cdots & 0 \end{bmatrix}$$

These vectors are combined to form a matrix, one per polarization, comprising all elements in the uniform rectangular array (URA) according to $$w_{1a} = w_{1za} w_{1ya}^T + \beta w_{2za} w_{1yb}^T$$

and $$w_{1b} = w_{1zb} w_{1ya}^T + \beta w_{2zb} w_{1yb}^T.$$

The phase adjustment factor $\beta$ is used to assure full power utilization. The actual value depends on how the expansion weights per dimension are defined. Following the procedure described herein the phase adjustment are in most cases equal to 1.

Finally the expansion weight matrixes for the second port are found as $$w_{2a} = F_z w_{1b}^* F_y$$

and $$w_{2b} = -F_z w_{1a}^* F_y$$

where $F_z$ and $F_y$), are matrices with ones on the anti-diagonal and zeros elsewhere. In case expansion factor 3 and 5 are not used the results at this stage are expansion weight matrixes that define two beam ports with identical power patterns, orthogonal polarization, non-shared resources (power amplifiers) and, for the two beam ports together, full power utilization.

If shared resources are desired this is obtained by the following procedure. First the matrices for the two ports are added as follows:

$$w_{1a\_shared} = w_{1a} + w_{2a}$$

and $$w_{1b\_shared} = w_{1b} + w_{2b}$$

Then matrices for the second port are formed by performing the following operations:

$$w_{2a\_shared} = F_z w_{1b\_shared}^* F_y$$

$$w_{2b\_shared} = -F_z w_{1a\_shared}^* F_y$$

In case expansion factors 3 or 5 are used the results is instead an expansion matrix that defines one beam port with a power pattern as given by the subarray. The expansion matrix connects the beam port to all power resources such that all power resources are utilized. In case a second beam port is generated, as described above without adding expansion weights since the first beam port already use all resources, a second beam port is found with the desired power pattern and orthogonal polarization sharing resources with the first beam port.

Figure 9:
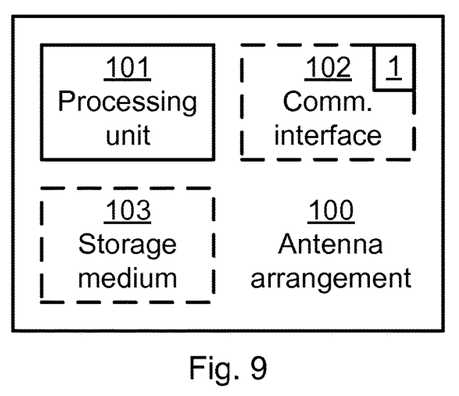
FIG. 9 is a block diagram showing functional units of an antenna arrangement according to an embodiment.

FIG. 9 schematically illustrates, in terms of a number of functional units, the components of an antenna arrangement 100 according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 130 (as in FIG. 13), e.g. in the form of a storage medium 103. Thus the processing unit 101 is thereby arranged to execute methods as herein disclosed. For example, the processing unit 101 is configured to generate any subarrays, such as in FIG. 4, and mappings to beam ports, such as in FIGS. 6 and 7, as herein disclosed.

The storage medium 103 may also comprise persistent storage, which, for example, can be any single one or combination of magnetic memory, optical memory, solid state memory or even remotely mounted memory. The antenna arrangement 100 may further comprise a communications interface 22 for transmitting and receiving signals As such the communications interface 22 may comprise an antenna array as in any of FIGS. 1, 2, 3, and 5.

The processing unit 21 controls the general operation of the antenna arrangement 100 e.g. by sending data and control signals to the communications interface 102 and the storage medium 103, by receiving data and reports from the communications interface 102, and by retrieving data and instructions from the storage medium 103. Other components, as well as the related functionality, of the antenna arrangement 100 are omitted in order not to obscure the concepts presented herein.

Figure 10:
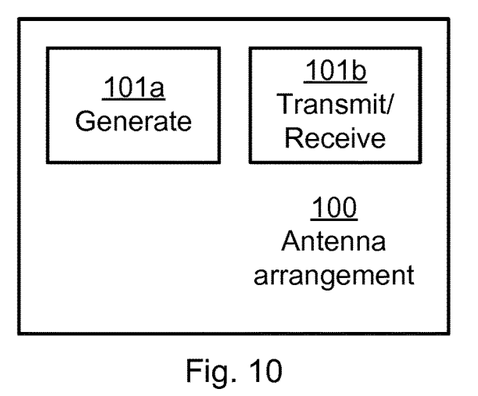
FIG. 10 is a block diagram showing functional modules of an antenna arrangement according to an embodiment.

FIG. 10 schematically illustrates, in terms of a number of functional modules, the components of an antenna arrangement 100 according to an embodiment. The antenna arrangement 100 of FIG. 10 comprises a number of functional modules; a generate module configured to perform below step S102, and a transmit/receive module 101b configured to perform below step S104. The antenna arrangement 100 of FIG. 10 may further comprises a number of optional functional modules. The functionality of each functional module 101a-101b is evident from the context of which the functional modules 101a-101b may be used. In general terms, each functional module 101a-101b may be implemented in hardware or in software. Preferably, one or more or all functional modules 101a-101b may be implemented by the processing unit 10, possibly in cooperation with functional units 102 and/or 103. The processing unit 101 may thus be arranged to from the storage medium 103 fetch instructions as provided by a functional module 101a-101b and to execute these instructions, thereby performing any steps as will be disclosed hereinafter.

Figure 11:
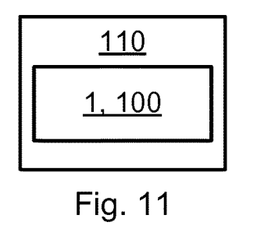
FIG. 11 schematically illustrates a network node comprising an antenna arrangement according to embodiments.
Figure 12:
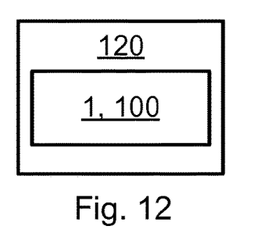
FIG. 12 schematically illustrates a wireless device comprising an antenna arrangement according to embodiments.

The antenna array 1 and/or the antenna arrangement 100 may be provided as integrated circuits, as standalone devices or as a part of a further device. For example, the antenna array 1 and/or antenna arrangement 100 may be provided in a radio transceiver device, such as in a network node 110 or a wireless device 120. FIG. 11 illustrates a network node 110 comprising at least one antenna array 1 and/or antenna arrangement 100 as herein disclosed. The network node 110 may be a BTS, a NodeB, an eNB, a repeater, a backhaul node, or the like. FIG. 12 illustrates a wireless device 120 comprising at least one antenna array 1 and/or antenna arrangement 100 as herein disclosed. The wireless device 120 may be a user equipment (UE), a mobile phone, a tablet computer, a laptop computer, etc. or the like.

The antenna array 1 and/or antenna arrangement 100 may be provided as an integral part of the further device. That is, the components of the antenna array 1 and/or antenna arrangement 100 may be integrated with other components of the further device; some components of the further device and the antenna array 1 and/or antenna arrangement 100 may be shared. For example, if the further device as such comprises a processing unit, this processing unit may be configured to perform the actions of the processing unit 31 associated with the antenna arrangement 100. Alternatively the antenna array 1 and/or antenna arrangement 100 may be provided as separate units in the further device.

Figure 13:
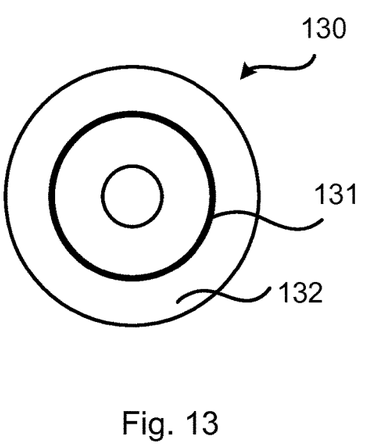
FIG. 13 schematically illustrates a computer program product according to an embodiment.

FIG. 13 shows one example of a computer program product 130 comprising computer readable means 132. On this computer readable means 132, a computer program 131 can be stored, which computer program 131 can cause the processing 101 21 and thereto operatively coupled entities and devices, such as the communications interface 102 and the storage medium 103, to execute methods according to embodiments described herein. The computer program 131 and/or computer program product 130 may thus provide means for performing any steps as herein disclosed.

In the example of FIG. 13, the computer program product 130 is illustrated as an optical disc, such as a CD (compact disc) or a DVD (digital versatile disc) or a Blu-Ray disc. The computer program product 130 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 131 is here schematically shown as a track on the depicted optical disk, the computer program 131 can be stored in any way which is suitable for the computer program product 130.

Figure 14:
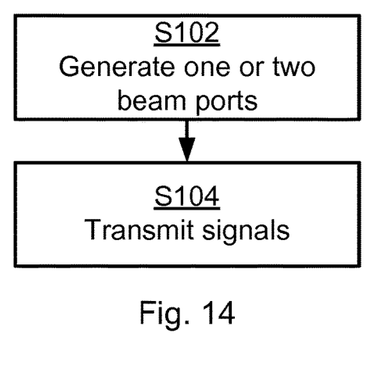
FIG. 14 is a flowchart of a method according to an embodiment.

Reference is now made to FIG. 14 illustrating a method for beam forming using an antenna array 1 according to an embodiment. The antenna array 1 comprises dual polarized elements. The method is performed by an antenna arrangement 100 comprising the antenna array 1. The method is advantageously provided as a computer program 32.

The antenna arrangement 100 is configured to, in a step S102, generate one or two beam ports. The one or two beam ports are defined by combining at least two non-overlapping subarrays. Each subarray has two subarray ports. The two subarray ports have, for each subarray, identical power patterns and mutually orthogonal polarization. The at least two non-overlapping subarrays are combined via expansion weights. The expansion weights map the one or two beam ports to subarray ports such that the one or two beam ports have the same power pattern as the subarrays. At least some of the expansion weights have identical non-zero magnitude and are related in phase to form a transmission lobe. The antenna arrangement 100 is configured to, in a step S104, transmit signals using the one or two beam ports.

Figure 15:
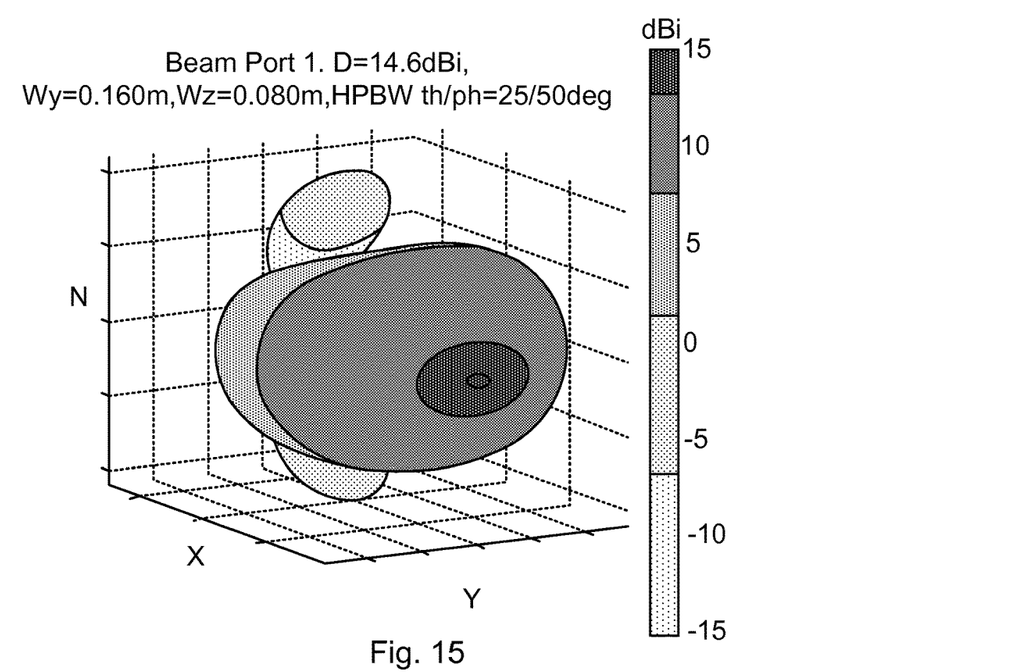
FIG. 15 shows simulation results of an example of a transmission lobe for a first beam port according to an embodiment.

FIG. 15 shows an example of a transmission lobe (beam pattern) of a first beam port (beam port 1) with azimuth half-power beam width (HPBW)=50° and elevation HPBW=25°.

Figure 16:
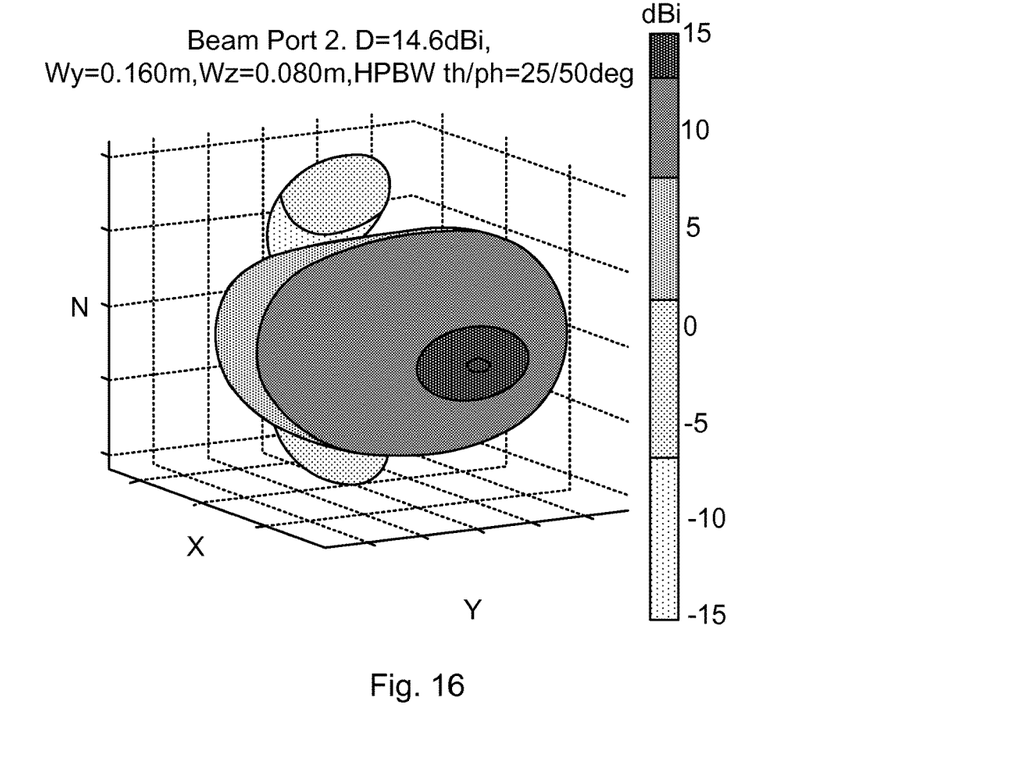
FIG. 16 shows simulation results of an example of a transmission lobe for a second beam port according to an embodiment.

FIG. 16 shows an example of a transmission lobe (beam pattern) of a second beam port (beam port 2) with azimuth HPBW=50° and elevation HPBW=25°, wherein the shape of the transmission lobe of the second beam port is identical to that of the first beam port (i.e., of the transmission lobe in FIG. 15). The transmission lobes of FIGS. 15 and 16 thus have identical power patterns. The lobes have (although not seen from FIGS. 15 and 16) orthogonal polarization in any direction.

FIG. 17 shows an example of a wide beam pattern created by means of conventional (SPBF) beamforming. The corresponding weight elements are provided to the left in FIG. 17. Hence, many weight elements have an amplitude set to zero, thus resulting in very poor power resource utilization.

FIG. 18 shows an example of a wide beam pattern created by means of conventional (SPBF) beamforming restricted to phase taper only for good power resource utilization. The corresponding weight elements are provided to the left in FIG. 18. However, the resulting beam pattern shows heavy ripple.

Figure 19:
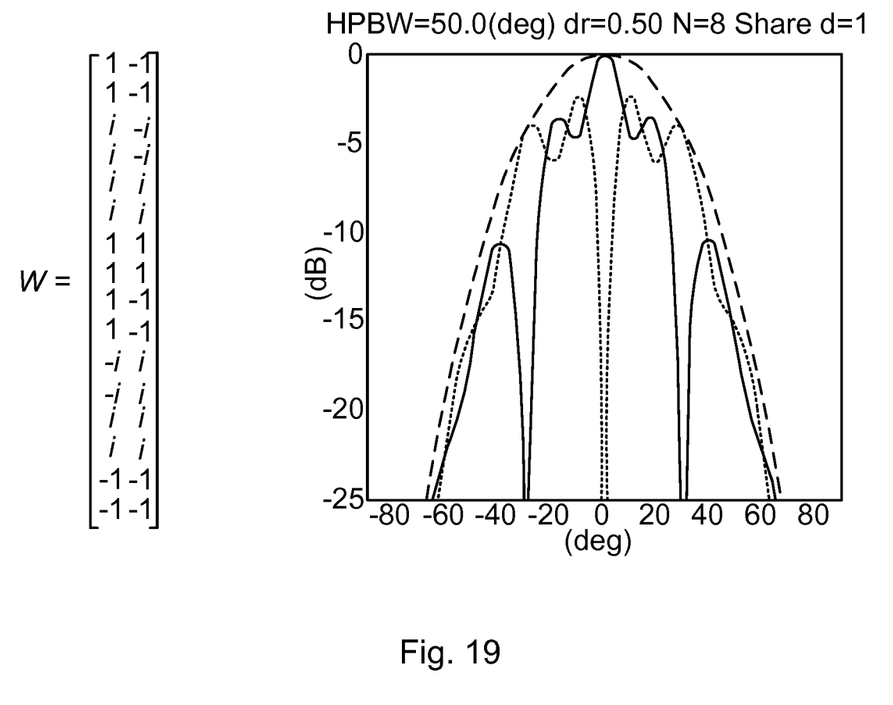
FIG. 19 shows simulation results for beamforming according to an embodiment.

FIG. 19 shows an example of a wide beam pattern formed according to embodiments disclosed herein. The beam patterns have the desired shape, here HPBW=50°, and very good power resource utilization. The corresponding weight elements are provided to the left in FIG. 19.

The inventive concept has mainly been described above with reference to a few embodiments. However, as is readily appreciated by a person skilled in the art, other embodiments than the ones disclosed above are equally possible within the scope of the inventive concept, as defined by the appended patent claims. For examples, although using LTE specific terminology, the herein disclosed embodiments may also be applicable to communications networks not based on LTE, mutatis mutandis.

The invention claimed is:

1. A method for beam forming using an antenna array comprising dual polarized elements, the method comprising: generating one or two beam ports:
   wherein the one or two beam ports are defined by combining at least two non-overlapping subarrays;
   wherein each subarray has two subarray ports, the two subarray ports having identical power patterns and mutually orthogonal polarization;
   wherein the at least two non-overlapping subarrays are combined via expansion weights;
   wherein the expansion weights map the one or two beam ports to subarray ports such that the one or two beam ports have the same power pattern as the subarray ports; and
   wherein at least some of the expansion weights have identical non-zero magnitude and are related in phase to form a transmission lobe;
   wherein the expansion weights are collected in an expansion matrix and are determined such that the expansion matrix is spatially white; and
   transmitting signals using the one or two beam ports.

2. The method of claim 1, wherein the expansion weights map the one or two beam ports to subarray ports such that the one or two beam ports have the same power pattern as the subarrays.

3. The method of claim 1, wherein:
   there are two beam ports; and
   the expansion weights are defined to keep the polarization of the two beam ports mutually orthogonal.

4. The method of claim 1, wherein:
   there are two beam ports; and
   the expansion weights map the two beam ports to products of powers of 2, 6, or 10 subarrays per dimension.

5. The method of claim 1, wherein there is one beam port; and
   the expansion weights map the beam port to powers of 2, 6, and/or 10 times 1, 3, or 5 subarrays.

6. The method of claim 1, wherein the subarrays are further expanded by further expansion weights before defining the one or two beam ports.

7. The method of claim 1, wherein the expansion weights are determined such that all elements in a matrix defined by the sum of the magnitude squared of the two-dimensional discrete Fourier transform of a first expansion weight matrix applied to a first of the subarray ports and the magnitude squared of the two-dimensional discrete Fourier transform of a second expansion weight matrix applied to a second of the subarray ports have the same value.

8. The method of claim 1, wherein the expansion weights are determined such that:

$$|DFT(ea)|^2 + |DFT(eb)|^2 = k \cdot J_{rc}$$

where DFT(ea) and DFT(eb) denote the discrete Fourier transforms of ea and eb, respectively, where ea and eb are the total expansion matrices applied to the subarray ports a and b, respectively, where a is first of the subarray ports, where b is a second of the subarray ports, where k is a constant, and where $J_{rc}$ is an all-one matrix having r rows and c columns.

9. The method of claim 1, wherein the at least two non-overlapping subarrays together cover all elements of the antenna array.

10. The method of claim 1, wherein the expansion weights of the at least two sub-arrays are added to generate one of the one or two beam ports.

11. The method of claim 1, wherein the expansion weights for a port a with a first polarization are determined as:

$$ea_2 = \begin{bmatrix} e^{i\frac{\pi}{4}[1\ -1]} \\ Z_{12} \end{bmatrix},$$

$$ea_6 = \begin{bmatrix} e^{i\frac{\pi}{4}\begin{bmatrix} 3 & 1 \\ 0 & 0 \\ 1 & 3 \end{bmatrix}} \\ Z_{32} \end{bmatrix},$$

$$ea_{10} = \begin{bmatrix} e^{i\frac{\pi}{4}\begin{bmatrix} -2 & 0 \\ -1 & 3 \\ 0 & 0 \\ 3 & -1 \\ 0 & -2 \end{bmatrix}} \\ Z_{52} \end{bmatrix},$$

where $ea_m$ denotes the expansion weights for mapping one beam port of the one or two beam ports to multiples of m subarrays, and where $Z_{rc}$ is an all-zero matrix having r rows and c columns.

12. The method of claim 11, wherein the expansion weights for a port b with a second polarization, orthogonal to the first polarization, is determined as:

$$eb_m = \text{flipud}([ea_m(:,2) - ea_m(:,1)]^*)$$

where $ea_m(:,c)$ denotes column c of $ea_m$, where * denotes complex conjugate, and where flipud(x) reverses the row order of x.

13. The method of claim 1, wherein the signals comprise at least one of broadcast information and system information.

14. The method of claim 1, wherein there are two beam ports; and wherein the expansion weights map the one or two beam ports to subarray ports such that the one or two beam ports have the same power pattern as the subarrays, and the two beam ports have mutually orthogonal polarizations in any direction.

* * * * *

UNITED STATES PATENT AND TRADEMARK OFFICE
CERTIFICATE OF CORRECTION

PATENT NO. : 10,622,715 B2  
APPLICATION NO. : 15/548445  
DATED : April 14, 2020  
INVENTOR(S) : Athley et al.

Page 1 of 2

It is certified that error appears in the above-identified patent and that said Letters Patent is hereby corrected as shown below:

In the Specification

In Column 5, Line 35, delete "id" and insert -- Id --, therefor.

In Column 6, Line 30-33, delete " $D_{port} = D_{subarray} 2^k 6^m 10^n, k=0,1,2 \ldots m=0,1,2, \ldots n=0,1,2, \ldots,$ " insert -- $D_{port} = D_{subarray} 2^k 6^m 10^n, k = 0,1,2, \ldots m = 0,1,2, \ldots n = 0,1,2, \ldots,$ --, therefor.

In Column 7, Line 43, delete "$eb_m$=flipud($[ea_m(:,2)-ea_m(:,1)]^*$)," and insert -- $eb_m = flipud([ea_m(:,2) \; -ea_m(:,1)]^*)$, --, therefor.

In Column 8, Line 6, delete "(0)" and insert -- (o) --, therefor.

In Column 9, Line 56, delete "$w_{1a}=w_{1za}w_{1ya}^T+\beta w_{2za}w_{1yb}^T$" and insert -- $w_{1a} = w_{1za}w_{1ya}^T + \beta w_{2za}w_{1yb}^T$ --, therefor.

In Column 9, Line 61, delete "$w_{1b}=w_{1zb}w_{1ya}^T+\beta w_{2zb}w_{1yb}^T$." and insert -- $w_{1b} = w_{1zb}w_{1ya}^T + \beta w_{2zb}w_{1yb}^T \cdot$ --, therefor.

In Column 10, Lines 3-8, delete "
$$w_{2a} = F_z w_{1b}^* F_y$$
and
$$w_{2b} = -F_z w_{1a}^* F_y$$
" and insert --
$$w_{2a} = F_z w_{1b}^* F_y$$
and
$$w_{2b} = -F_z w_{1a}^* F_y$$
--, therefor.

In Column 10, Line 9, delete "$F_y$), are" and insert -- $F_y$ are --, therefor.  
In Column 10, Line 26, delete "$w_{2a\_shared}=F_z w_{1b\_shared}^* F_y$" and insert Signed and Sealed this  
First Day of September, 2020

Andrei Iancu  
*Director of the United States Patent and Trademark Office*

CERTIFICATE OF CORRECTION (continued)
U.S. Pat. No. 10,622,715 B2

-- $w_{2a\_shared} = F_z w^*_{1b\_shared} F_y$ --, therefor.

In Column 10, Line 29, delete "$w_{2b\_shared}=F_z w_{1a\_shared}*F_y$" and insert -- $w_{2b\_shared} = -F_z w^*_{1a\_shared} F_y$ --, therefor.

In Column 11, Line 19, delete "processing unit 10," and insert -- processing unit 101, --, therefor.

In Column 11, Line 21, delete "to from" and insert -- to form --, therefor.

In Column 11, Line 47, delete "processing unit 31" and insert -- processing unit 21 --, therefor.

In Column 11, Line 55, delete "processing 101 21" and insert -- processing unit 101, 21 --, therefor.

In the Claims

In Column 13, Line 15, in Claim 1, delete "post; and" and insert -- post; --, therefor.

In Column 14, Line 41, in Claim 1, delete "$eb_m$=flipud($[ea_m(:,2)–ea_m(:,1)]*$)" and insert -- $eb_m$=flipud($[ea_m(:,2) - ea_m(:,1)]*$) --, therefor.